United States Patent
Maneuf et al.

(10) Patent No.: US 11,399,922 B2
(45) Date of Patent: Aug. 2, 2022

(54) METHOD FOR FABRICATING A DENTAL PART AND DEVICE FOR FABRICATING A DENTAL PART

(71) Applicants: Bernard Maneuf, Voiron (FR); Bruno Clunet-Coste, Saint-Etienne-de-Crossey (FR); André Collombin, Voiron (FR); Raphael Richert, Lyons (FR)

(72) Inventors: Bernard Maneuf, Voiron (FR); Bruno Clunet-Coste, Saint-Etienne-de-Crossey (FR); André Collombin, Voiron (FR); Raphael Richert, Lyons (FR)

( * ) Notice: Subject to any disclaimer, the term of this patent is extended or adjusted under 35 U.S.C. 154(b) by 374 days.

(21) Appl. No.: 16/781,675

(22) Filed: Feb. 4, 2020

(65) Prior Publication Data
US 2020/0246117 A1 Aug. 6, 2020

(30) Foreign Application Priority Data
Feb. 4, 2019 (FR) ...................................... 1901083

(51) Int. Cl.
*A61C 13/00* (2006.01)
*A61C 5/77* (2017.01)
*A61C 13/087* (2006.01)

(52) U.S. Cl.
CPC ............ *A61C 13/0019* (2013.01); *A61C 5/77* (2017.02); *A61C 13/087* (2013.01)

(58) Field of Classification Search
CPC ...... A61C 13/0019; A61C 13/087; A61C 5/77
USPC ...................................................... 433/202.1
See application file for complete search history.

(56) References Cited

U.S. PATENT DOCUMENTS

| | | | | |
|---|---|---|---|---|
| 8,597,762 B2 * | 12/2013 | Clunet-Coste | ......... | A61C 13/01 428/137 |
| 11,197,744 B1 * | 12/2021 | Raslambekov | ........ | A61C 13/26 |
| 2005/0110177 A1 * | 5/2005 | Schulman | .......... | A61C 13/0003 264/16 |
| 2008/0318189 A1 * | 12/2008 | Brodkin | ................. | A61K 6/887 433/223 |
| 2010/0233655 A1 * | 9/2010 | Karim | ................ | A61C 13/0009 433/172 |
| 2012/0261848 A1 * | 10/2012 | Haraszati | ............... | B33Y 80/00 264/17 |

(Continued)

FOREIGN PATENT DOCUMENTS

WO 2018/087383 A1 5/2018

OTHER PUBLICATIONS

Nov. 8, 2019 Search Report issued in French Patent Application No. 1901083.

*Primary Examiner* — Matthew M Nelson
(74) *Attorney, Agent, or Firm* — Oliff PLC (57) ABSTRACT

A data set representative of a dental part to be fabricated is provided. The data set defines dimensional and mechanical characteristics of the dental part. First and second patterns are made by 3D printing. A first set of fibres is deposited on a top surface of the first pattern before the second pattern is deposited. The first set of fibres includes a plurality of first fibres oriented in a first set of directions by means of the data set. A second set of fibres is deposited on a top surface of the second pattern. The second set of fibres includes a plurality of second fibres oriented in a second set of directions defined by means of the data set. A third pattern is made from a third resin by 3D printing by means of the data set.

7 Claims, 3 Drawing Sheets

(56) References Cited

U.S. PATENT DOCUMENTS

| | | | | |
|---|---|---|---|---|
| 2014/0147815 A1* | 5/2014 | Sicurelli | ............... | A61C 13/30 |
| | | | | 433/220 |
| 2016/0047064 A1* | 2/2016 | Khandaker | ........ | A61C 13/0006 |
| | | | | 264/16 |
| 2016/0310077 A1* | 10/2016 | Hunter | .................. | A61F 2/0059 |
| 2017/0360534 A1* | 12/2017 | Sun | ....................... | A61K 6/884 |
| 2018/0000570 A1* | 1/2018 | Sun | ....................... | B29C 64/124 |
| 2018/0049850 A1* | 2/2018 | Gassler | ............. | A61C 13/0003 |
| 2018/0280116 A1* | 10/2018 | Hansen | ................. | B33Y 80/00 |
| 2019/0053883 A1* | 2/2019 | Sun | ....................... | C08G 18/10 |
| 2019/0307534 A1* | 10/2019 | Schwitalla | ......... | A61C 13/0018 |
| 2020/0246117 A1* | 8/2020 | Maneuf | ................... | A61C 5/77 |
| 2020/0375704 A1* | 12/2020 | Rabe | ..................... | B33Y 10/00 |

\* cited by examiner

METHOD FOR FABRICATING A DENTAL PART AND DEVICE FOR FABRICATING A DENTAL PART

BACKGROUND OF THE INVENTION

The invention relates to methods for fabricating dental parts, and for example to dental reinforcements and prosthetic dental parts. The invention also relates to a robot for fabricating one such dental part.

PRIOR ART

When installation of a prosthetic dental device is performed, it is common practice to take an imprint of the part to be replaced or of the area on which the prosthetic device is to be fitted so that the prosthetic dental device matches the geometric configuration of the patient. For example, it is commonplace to take an imprint of the patient's teeth so as to be able to shape the prosthesis so that it matches the arrangement of the immediately adjacent teeth and to ensure that the forces applied are substantially identical to those of the other teeth.

It is also known to form the prosthesis from a material or a set of particular materials so as to be able to withstand the expected conventional stresses, for example the tooth is formed from a material able to withstand chewing forces. However, depending on the position of the tooth, the configuration of the jaw and the other parameters representative of the individual, the direction, intensity and recurrence of the functional stresses to which the prosthetic part is subjected are different from one user to the other. Existing prosthetic parts do not adjust to these differences of functioning and are configured to withstand a predefined set of stresses representative of a conventional use.

Therefore, to improve acceptance of the prosthesis, both its mechanical performances and its dimensions have to be adjusted to match the user's requirements. It is quite evident that the use of a universal standardised reinforcement cannot meet the specific requirements of each user as the dimensional constraints and mechanical stresses are, by definition, unique.

To form a tailor-made prosthesis, it is known to start from a bulk part and to machine this part to achieve the required three-dimensional shape. This method does not enable a prosthesis to be formed having the required mechanical characteristics to match the user's requirements. Only the final shape of the prosthesis is adjusted to match the user's requirements.

This results in the initial bulk part being formed from a single material, the mechanical characteristics often being isotropic and adjustment of the prosthesis as far as its shape is concerned not enabling the mechanical performances to be matched.

This also results in the initial bulk part being formed by a matrix reinforced by one or more fibres, machining of the bulk part cutting the fibres which has the effect of compromising the strength of the prosthesis and its ability to be polished before it is installed. This problem is present whether the matrix is reinforced by long fibres or by short fibres. In conclusion, machining of an initial bulk part does not enable a prosthesis to be formed that is able to adjust to the mechanical stresses present in use.

It is also known to use a reinforcement comprising a flexible matrix associated with fibres. The reinforcement is deformable which means that its shape can be adjusted to match the area on which the prosthesis is to be fitted. Once the reinforcement has been installed, it is polymerized, for example photo-polymerized to form a reinforcement that is mechanically much stronger. In conventional manner, the reinforcement is shaped on a laboratory model before being fitted in the patient's mouth. This approach is advantageous as the reinforcement can use fibre networks, woven fibres or unidirectional fibres which enables a reinforcement to be used having mechanical properties that are more suited to requirements. It is however apparent that when shaping of the reinforcement is performed, the fibres are deformed which modifies the mechanical behaviour of the reinforcement. It is then impossible to specifically adjust the mechanical performances of the reinforcement to match the user's requirements. As for the previous solution, it is advantageous to have a very strong reinforcement to prevent deterioration of the latter.

In dental laboratories, it is known to use a support made from acrylic resin that has been shaped to achieve the shape required for the prosthesis. The support is machined to define a plurality of grooves. Reinforcing fibres are placed inside these grooves. This solution enables the shape and mechanical performances to partially match those required for the prosthesis. It is however apparent that this configuration only enables a temporary reinforcement to be formed providing a functioning that is acceptable over a short period of time only. This reinforcement is not able to form a prosthesis having a geometric configuration and three-dimensional mechanical performances suitable to meet the particular requirements of the musculoskeletal context of the user.

OBJECT OF THE INVENTION

One object of the invention consists in remedying these shortcomings, and more particularly in providing a method for fabricating a dental part having a shape and mechanical performances which are better mastered while being easy to implement.

According to one feature of the invention, a method for fabricating a dental part is proposed comprising the following successive steps:

providing a data set representative of the dental part to be fabricated, the data set defining dimensional and mechanical characteristics of the dental part, forming a first pattern made from a first resin by 3D printing by means of the data set, depositing a first set of fibres on a top surface of the first pattern, the first set of fibres comprising a plurality of first fibres oriented in a first set of directions, the first set of directions being defined by the data set, the first set of fibres defining a first set of through holes, forming a second pattern made from a second resin by 3D printing by means of the data set, the second pattern filling at least a part of the first set of through holes to come into contact with the surface of the first pattern, the second pattern at least partially covering the first set of fibres, depositing a second set of fibres on a top surface of the second pattern, the second set of fibres comprising a plurality of second fibres oriented in a second set of directions different from the first set of directions, the second set of directions being defined by means of the data set, the second set of fibres defining a second set of through holes, forming a third pattern made from a third resin by 3D printing by means of the data set, the third pattern filling at least a part of the second set of through holes to come into contact with the surface of the second pattern, the third pattern completely covering the second set of fibres, polymerizing the first pattern, second pattern, third pattern and first and second sets of fibres to form the dental part.

According to a development, the first set of fibres and/or second set of fibres comprise at least one fibre pre-impregnated by a resin, and a polymerization step is performed to make the resin react and fix the pre-impregnated resin respectively with the top wall of the first pattern and/or of the second pattern.

Preferentially, the first set of fibres and/or second set of fibres comprise at least one fibre pre-impregnated by a resin, and a polymerization step is performed to define a three-dimensional shape of the at least one pre-impregnated fibre salient from the top surface of the first pattern and/or of the second pattern by a larger distance than the diameter of the at least one pre-impregnated fibre.

In a particular embodiment, the polymerization step is a point-by-point polymerization to progressively fix the three-dimensional shape of the at least one pre-impregnated fibre as the at least one pre-impregnated fibre leaves a three-dimensional fibre installation device.

It is advantageous to provide for the first and second sets of fibres not to overrun onto the outer wall of the dental part.

Advantageously, the method comprises making of an intraoral imprint to obtain a digital file at least partially defining the dimensional characteristics of the dental prosthesis and to model a progression path of the fibres of the first set of fibres to at least partially define the mechanical characteristics of the dental part.

Another object of the invention consists in providing a robot for fabrication of a dental part having a shape and mechanical performances that are better mastered. The robot is able to adjust the performances of the dental part to the user's requirements to form a tailor-made product.

According to one feature of the invention, a robot for fabrication of a dental part is proposed comprising a control circuit connected to a three-dimensional print head and to a three-dimensional installation device of at least one fibre.

The robot is remarkable in that the control circuit is connected to a memory area containing a data set representative of the dental part to be fabricated, the data set defining dimensional and mechanical characteristics of the dental part and in that the control circuit is configured to break the dental part down into a plurality of patterns successively formed by the three-dimensional print head, the control circuit depositing a set of fibres with an arrangement defined by the data set between two consecutive patterns.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

To form a dental part such as for example a dental prosthesis or a dental reinforcement, a fabrication device is provided with a data set. The data set is representative of the dental part to be fabricated, for example the dental prosthesis or reinforcement. This data set defines the three-dimensional shape of the dental part and its mechanical characteristics. In other words, the data set defines the dimensions of the dental part along three orthogonal axes enabling the shape of the side walls and the shape of the top wall to be defined. The dental part is defined by a matrix reinforced by reinforcing fibres.

The data set also defines the material of the matrix forming the prosthesis as well as the position and the materials of the reinforcing fibres contained in the matrix. The dental part is formed by a composite material with a matrix made from at least one resin and a plurality of reinforcing fibres extending inside the matrix. The different reinforcing fibres are arranged in three-dimensional manner so that the dental part can withstand a predefined set of stresses. The data set can be stored in a memory contained in a computer.

The inventors observed that the nature and location of the stresses differ according to the area of a dental part that is studied. For example, the crown part of a prosthetic tooth is not subjected to the same set of stresses as the root part. The same is substantially the case for all dental parts where the set of stresses present within the dental part is very different from the set of stresses present at its two opposite ends.

In order for the dental part to suit the user in optimal manner, it is particularly advantageous to adjust the mechanical performances to the different portions of the dental part. Depending on the requirements, this also results in one or more types of different reinforcements having to be used to form the dental part. The mechanical performances of the matrix play a role in locating the reinforcements inside the dental part. Different areas having different mechanical performances can be identified. These areas all have a matrix material with reinforcing fibres. Differentiation of the mechanical performances plays a role in differentiation of the volume content of reinforcing fibres, by the orientation of the reinforcing fibres and/or by the material forming the reinforcing fibres and/or the matrix.

The data set representative of the dental part defines the shape of the dental part, i.e. its different dimensions, and the path taken by the reinforcing fibres in the dental part. The number and position of the reinforcing fibres are dependent on the mechanical performances of the matrix, the mechanical performances of the fibres and the stresses to which the dental part will be subjected. The data set defines the number and position of the fibres in the dental part according to the stresses to be withstood.

The data set representative of the dental part to be fabricated can be obtained by any suitable means. However, it appears particularly advantageous to take an intraoral imprint by means of a digital camera. This method enables a numerical data file to be generated defining the three-dimensional imprint of the environment of the dental part by means of an optic system. In this way, depending on the configurations, a part or all of the shape of the dental part is calculated.

The numerical data file can represent the teeth on which the reinforcement dental is to be fitted. The numerical data file can also represent the gap to be filled or the tooth which is to be replaced by the dental prosthesis. The numerical data file can further represent a part of the palate on which the dental reinforcement is to be placed. In general manner, the numerical data file can represent any intraoral part that may have to collaborate with the dental part as well as the dental part to be replaced.

Once the imprint has been made, the mechanical characteristics of the dental part are calculated. Analysis of a large number of clinical cases has enabled different categories of parts to be defined, for example different categories of reinforcements. Each category of dental part, for example a reinforcement part, presents a specific three-dimensional configuration and a specific location of the reinforcing fibres in the matrix.

Identification of the category of the reinforcement is advantageously performed differentiating adults from children. It is also possible to differentiate between men and women.

Identification of the dental part category is advantageously performed differentiating the position of the dental part in the mouth, for example a reinforcement, and therefore the teeth with which the reinforcement is to collaborate. The reinforcement will be different depending on whether it collaborates with molars, premolars, canines or incisors.

Identification of the category of the reinforcement is performed taking account of the type of part to be fabricated, for example making a difference between a comfort part and a part having the purpose of repairing a trauma.

All this data enables the three-dimensional shape of the dental part, and especially the set of stresses to be withstood, to be adjusted.

A computing device generates the three-dimensional data set representative of the dental part to be fabricated by means of the category of reinforcement to be used and the dimensions of the reinforcement to be fitted. The computing device generates the three-dimensional data set advantageously taking account of the other specific data such as the mechanical performances of the resin used to form the matrix and the mechanical performances of the different reinforcing fibres available. The computing device can be present in a computer.

To generate the three-dimensional data set, the computing device can also take additional data into account such as identification of bruxism, the user's age or the fragility of an adjacent tooth.

The three-dimensional data set defines the dimensions of the reinforcement and the path taken by the different reinforcing fibres inside the dental part in order to adjust the mechanical performances of the reinforcement to the mechanical stresses of the user and to the outer walls of the reinforcement and to enhance integration of the dental part in the user's mouth.

In advantageous manner, the computing device is configured so as to prevent a reinforcing fibre from overrunning onto the outer surface of the dental part. In other words, the reinforcing fibres are all separated from the outside environment by the matrix, i.e. by a resin layer. This particularity prevents weakening of the dental part when the latter is installed. In traditional techniques, it is often necessary to machine the surface slightly before inserting the dental part in a laboratory model or in a user's mouth. It is quite common to have a reinforcing fibre that appears at the surface of the dental part and that can form a weak area in time.

In advantageous manner, the computing device is configured so as to use at least one reinforcing fibre in the form of a roving. The roving has good mechanical performances which is particularly advantageous for forming a dental part.

Preferentially, the computing device is configured to divide the dental part into a plurality of resin patterns superposed on one another. The number of patterns to be formed and superposed depends on the required dental part and on the fibres to be incorporated to obtain the required mechanical performances. The resin patterns are formed successively.

Figure 1:
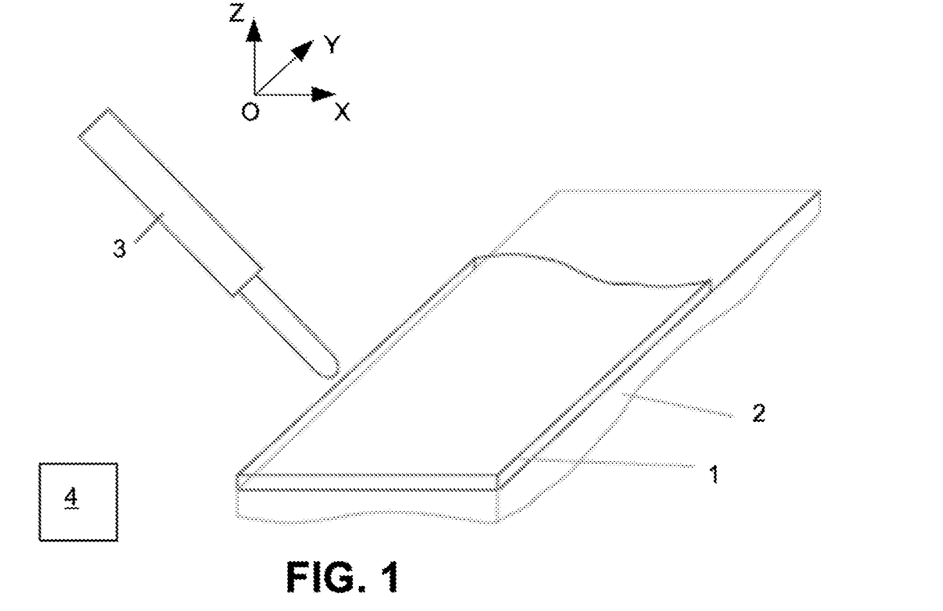
FIG. 1 schematically illustrates deposition of a first pattern by means of a three-dimensional print head for a dental part according to the invention.

As illustrated in FIG. 1, a first resin layer 1 is deposited on a support 2. First resin layer 1 defines a first three-dimensional pattern with a shape and at least one material. First resin layer 1 is deposited by a 3D print head 3 connected to computing circuit 4 that provides the data set. The top surface of the first resin layer can be flat or of any shape. The thickness of first resin layer 1 can be constant over the whole of the first layer or variable in order to adjust to the mechanical requirements of the dental part.

Figure 2:
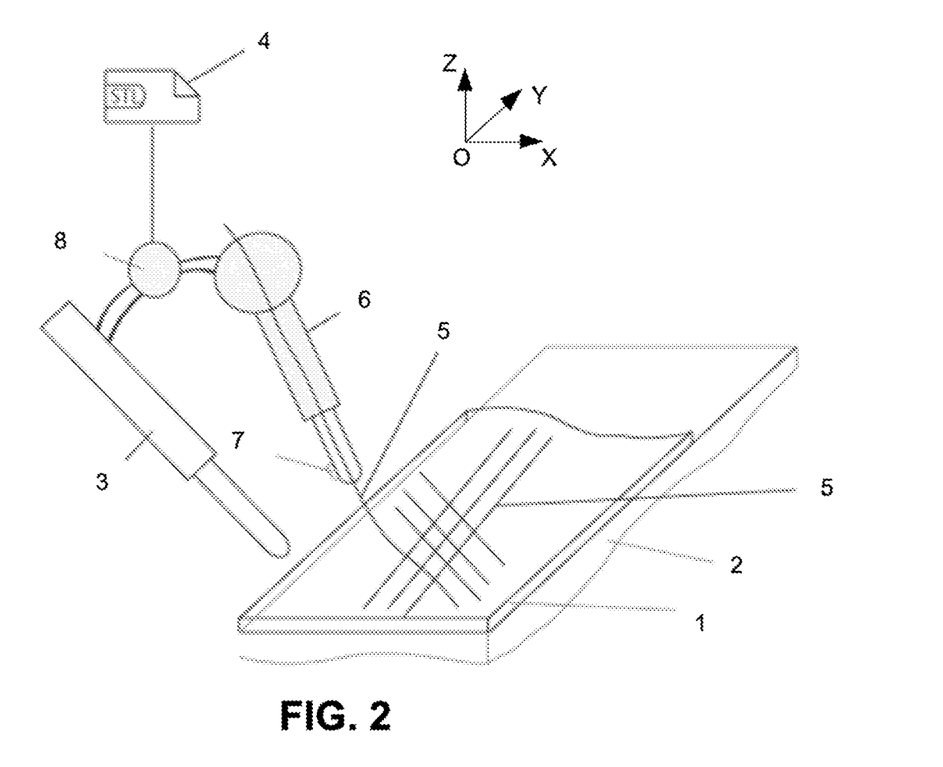
FIG. 2 schematically illustrates deposition of a first set of reinforcing fibres on the first pattern for a dental part according to the invention.

As illustrated in FIG. 2, reinforcing fibres 5 are placed in the form of a set of reinforcing fibres on the top surface of first pattern 1.

As another pattern will subsequently be formed, fibres 5 are arranged between two adjacent resin patterns 1. Reinforcing fibres 5 are arranged with a precise configuration imposed by computing circuit 4 on first pattern 1. Fibres 5 are arranged on the patterns by means of an installation device 6 of fibres 5. Computing circuit 4 provides installation device 6 with the data relating to the type of fibre to be deposited and the three-dimensional configuration to be applied for each fibre 5.

The set of reinforcing fibres 5 defines a through opening enabling the first pattern to come into direct contact with the second pattern. The first resin forming the first pattern comes into contact with the second resin forming the second pattern making for ease of mechanical connection between the two patterns.

The top or apical surface of each pattern 1 can be flat or patterned. The texturing of the top surface of a pattern 1 is advantageously chosen so as to define to the position of the set of fibres 5. In other words, if the three-dimensional data set provides for a set of fibres having to be arranged in one and the same plane, it is particularly advantageous to terminate a pattern 1 by said plane so as to be able to easily deposit the different fibres 5 with the required configuration. Following the same logic, the surface of pattern 1 can be textured so as to present a texture that reproduces the orientation of the different reinforcing fibres 5 to be subsequently deposited.

In advantageous manner, reinforcing fibres 5 are deposited individually on pattern 1 so as to be able to control the position and orientation of each reinforcing fibre 5 in the dental part precisely.

The fibres of set of fibres 5 can define a mesh or any other form enabling the required mechanical performances to be achieved. As fibres 5 are deposited individually, no deformation of the fibre mats 5 takes place when installation of the fibres 5 is performed, as is the case in the prior art. As fibres 5 are deposited individually, the dental part does not have a network of woven fibres. Fibres 5 can be fitted straight or zig-zagged with shapes suitable for withstanding the set of stresses. Fibres 5 are advantageously flat fibres with a smaller thickness than their width and length. Fibres 5 can be deposited by means of a nozzle, for example a flat nozzle. The nozzle can be configured to simultaneously deposit several fibres thereby making it easier to obtain fibres having a constant spacing between them whatever the movement of the nozzle when the fibres are placed. The nozzle can be configured to form a mat of reinforcing fibres 5.

First pattern 1 is configured to adjust its thickness to the stresses of the bottom layers so that the top layer is as close as possible which is desirable for the orientation of fibres 5 of the set of fibres to be deposited. The thickness of the different patterns 1 can be identical or substantially identical or the thicknesses can vary greatly depending on the locations where the fibres are to be deposited.

Figure 3:
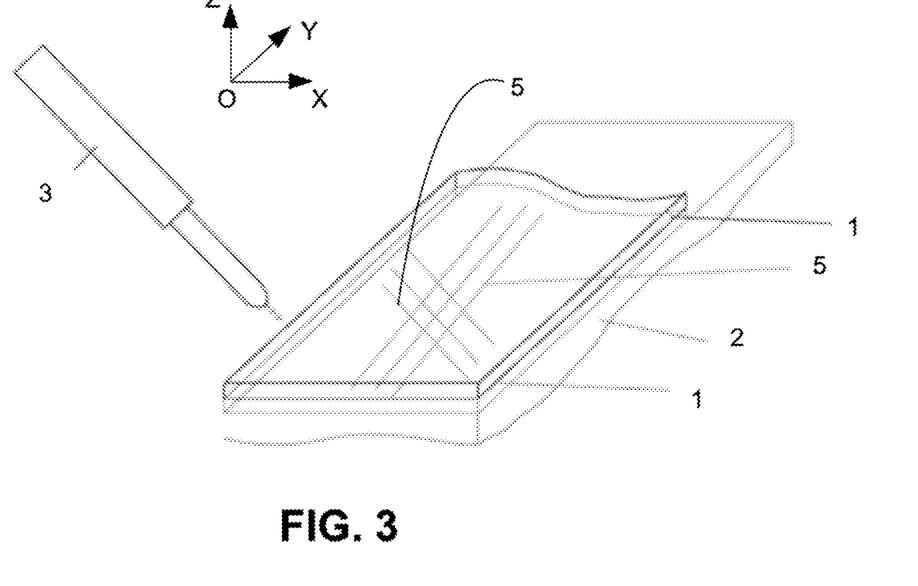
FIG. 3 schematically illustrates deposition of a second pattern by means of a three-dimensional print head on the first set of reinforcing fibres and the first pattern for a dental part according to the invention.

As illustrated in FIG. 3, a second pattern 1 is deposited on first pattern 1 and the first set of reinforcing fibres 5. Second pattern 1 is deposited by means of print head 3 which receives the data from computing circuit 4.

In advantageous manner, computing circuit 4 is configured to define a reinforcing fibre 5 passing through several consecutive patterns 1. In other words, if patterns 1 are considered to be stacked in a direction Oz, computing circuit 4 is configured to define a fibre 5 that mainly extends in the direction Oz. In the illustrated example, the direction Oz is perpendicular to the plane OxOy representing the top surface of a pattern 1. Reinforcing fibre 5 passes through at least one pattern 1 deposited on the bottom pattern supporting the salient fibre 5. Pattern 1 is deposited around reinforcing fibre 5 which can extend beyond pattern 1 that has just been formed. Fibre 5 is considered to be salient when it protrudes out from the top surface of pattern 1 by a larger distance than its diameter or thickness.

To be able to define the position of fibre 5 precisely in the different directions, it is particularly advantageous to provide for reinforcing fibre 5 to be a fibre impregnated with a resin which is advantageously the same resin as the one forming reinforcing matrix 1 or at least pattern 1 supporting fibre 5. Fibre 5 is installed by means of a three-dimensional installation head 6. Installation head 6 moves and deposits a fibre 5 in a direction defined by the data set.

Figure 4:
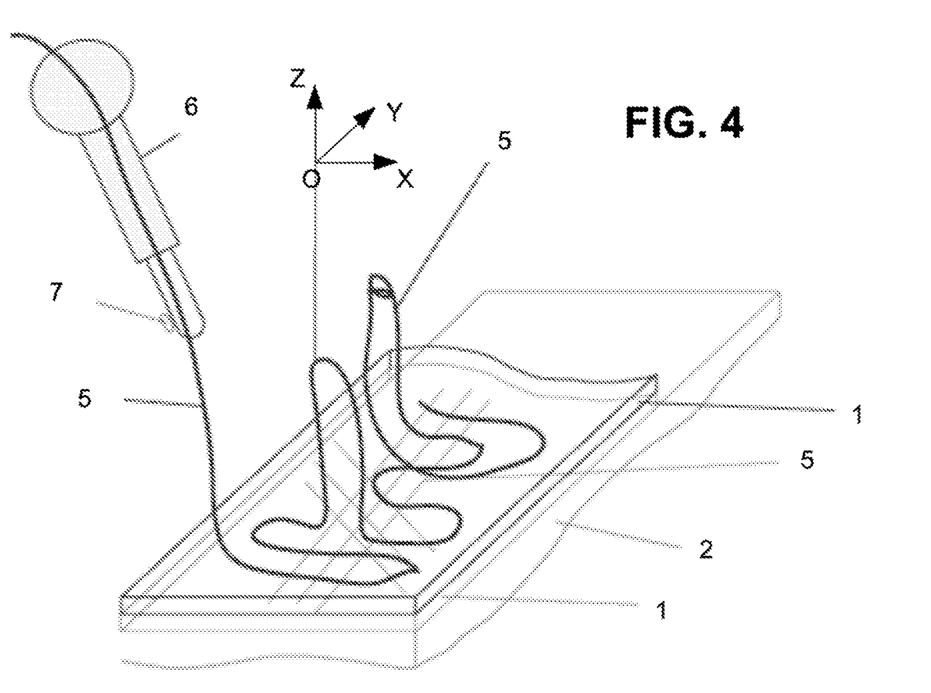
FIG. 4 schematically illustrates deposition of a second set of reinforcing fibres on the second pattern for a dental part according to the invention.

Advantageously, as fibre 5 is fitted in the space, it is progressively subjected to a step of at least partial polymerization so as to polymerize the resin surrounding it. Polymerization of the resin is configured either to make the resin of fibre 5 react with the resin of pattern 1 in contact thereby fixing fibre 5 on the surface of pattern 1 or to form a rigid enclosure of fibre 5 to be able to define a three-dimensional shape for fibre 5 which cannot press on patterns 1 which will be formed later. FIG. 4 illustrates a configuration where fibre 5 is polymerized to be salient from the top wall of a second pattern 1.

After shaping of fibre 5, one or more new patterns 1 will be deposited surrounding salient fibre 5 to form at the outcome a solid reinforcement in a single piece.

To form the dental part, the method breaks the dental part down into a plurality of patterns 1 which are successively deposited on one another. A set of reinforcing fibres 5 is deposited between two depositions of successive patterns 1. A pattern 1 is deposited between two successive depositions of reinforcing fibres 5.

The different successively deposited patterns 1 have shapes in the three dimensions that will define the final shape of the reinforcement. The thicknesses of patterns 1 are advantageously chosen so as to define the positions of fibres 5 in a plane separating two consecutive patterns 1.

In a particular embodiment, the top walls of patterns 1 are flat so as to easily form sets of fibres 5 installed in flat manner between two patterns 1.

Once first pattern 1 has been formed, a first set of reinforcing fibres 5 is deposited on the top wall of first pattern 1 (FIG. 1). In a particular embodiment, fibres 5 of the first set of fibres 5 are deposited continuously in contact with the top wall of first pattern 1 so that reinforcing fibres 5 are arranged in the top plane of first pattern 1.

FIG. 1 illustrates deposition of a first pattern on support 2. First pattern 1 is deposited with a first shape with first transverse dimensions. First pattern 1 has a top wall and one or more side walls.

In advantageous manner, the top wall is flat. Preferentially, the thickness of first pattern 1 is constant. In a preferential configuration, the top wall of first pattern 1 comprises one or more salient pads forming blockers for reinforcing fibres 5. The blockers prevent transverse movement of the fibres when formation of the pattern takes place. The blockers are advantageously formed by the 3D print head 3 when formation of first pattern 1 is performed.

As an alternative embodiment or as a complement, fibres 5 are covered by a resin. Fibres 5 are deposited on the top wall of pattern 1 and a polymerization step is performed so as to stick fibre 5 onto the top wall. It is then possible not to use the salient pads.

In a first configuration, each fibre 5 is polymerized after being formed on the top wall. A fibre 5 is formed and then polymerized before the next fibre is formed. All the fibres 5 are formed and fixed by polymerization before the next pattern is deposited. In another configuration, all the fibres are deposited on the top surface of pattern 1 and a polymerization step is performed on the set of fibres 5 to fix them before depositing the next pattern 1. It is also possible to form a part of the fibres according to the first configuration and a part of the fibres according to the second configuration. It is also possible to form a first set of patterns according to the first configuration followed by a second set of patterns according to the second configuration in a reinforcing part comprising several patterns.

In an advantageous embodiment, fibres 5 are deposited one after the other thereby enabling a network of fibres 5 to be formed comprising different fibres 5 oriented with a particular layout in the three dimensions. It is possible to form criss-cross fibres 5 with a specific configuration enabling a pattern with specific mechanical performances to be formed.

In a particular configuration, fibres 5 are supplied by a tank of fibres 5. The fibre is formed on output from the tank which provides a large length of fibre arranged in the required three-dimensional configuration. The fibre is cut to the required dimension by a cutter 7 mounted on installation device 6.

In another configuration, the fibre tank comprises several distinct fibres. The different fibres are deposited according to the three-dimensional configuration and are cut to the selected size. The fibres are taken one after the other from the fibre tank to be deposited with the required three-dimensional configuration and are then cut.

In advantageous manner, the fibre tank contains fibres having different mechanical characteristics so as to be able to adjust the characteristics of the dental part using mechanically different fibres with specific three-dimensional configurations.

The tank of reinforcing fibres can comprise fibres made from organic material, for example fibres made from an acrylic material base, viscose fibres, aramid fibres or fibres made from phenolic material. It is also possible to use fibres made from PolyEtherEtherKetone or PEEK. It is also possible to provide for the tank of reinforcing fibres to comprise siliceous mineral fibres, glass fibres, quartz fibres, or silica fibres.

A set of reinforcing fibres 5 comprises a plurality of reinforcing fibres 5 at least one of which is advantageously chosen from the materials listed above.

The material used to form the patterns is advantageously chosen from acrylic based resins, urethane dimethacrylate or UDMA resins, bisphenol A glycidyl methacrylate or BIS GMA resins, epoxy resins, or polyester resins.

Reinforcing fibre 5 can be in the form of a braid before it is deposited.

Patterns 1 are formed from a print head 3 moving in the three dimensions to deposit the resin and define the shape of the different patterns 1. Print head 4 defines the overall shape of the dental part by means of successive depositions of patterns 1. Print head 3 is connected to a resin tank enabling the required resin to be deposited at the selected location. The resin tank can contain a single resin from the different above-mentioned resins or it can comprise several sub-tanks each containing a different resin.

Print head 3 is associated with a robot configured to move print head 3 in the three dimensions. The robot is connected to computing circuit 4 which provides the three-dimensional data set representative of the dental part to be fabricated.

Computing circuit 4 provides the robot with a first data set to form a first pattern 1 in a first resin. First pattern 1 is defined by a first set of dimensions. In advantageous manner, first pattern 1 is solid. First pattern 1 is formed by means of print head 3 which deposits the first resin in the required places.

Computing circuit 4 then provides the robot with a second data set to deposit reinforcing fibres 5 that are to form the first set of reinforcing fibres 5. The robot distributes the different fibres according to the coordinates and sequences provided by computing circuit 4 and therefore taken from the three-dimensional data set representative of the dental part to be fabricated.

The robot can also stretch reinforcing fibres 5 to mechanically stress the latter when deposition is performed. One end of the fibre is polymerized on the first pattern before being stressed and the end is polymerized while fibre 5 is tensile stressed.

The robot can also compact reinforcing fibres 5. The robot is configured to perform crushing of reinforcing fibres 5 after the latter have been deposited on first pattern 1 or on any pattern 1. When deposition of fibres 5 is performed, the print head is separated from the surface of the reinforcement by a predefined distance. This predefined distance can however be smaller than the thickness of fibres 5 so that fibres 5 will hamper optimum deposition of the material designed to fill the spaces between fibres 5 and form the subsequent pattern 1. It is therefore particularly advantageous to compress fibres 5 so as to reduce the thickness of fibres 5 and form better defined patterns 1. The predefined distance is advantageously about one tenth of a millimetre, and compression of fibres 5 makes it possible to use fibres 5 having a thickness of more than one tenth of a millimetre and to then reduce this thickness to less than one tenth of a millimetre to form pattern 1.

Once reinforcing fibres 5 have been deposited and advantageously fixed to first pattern 1, a second pattern 1 is deposited so as to fill the spaces situated between fibres 5 to prevent fibres 5 from forming a part of the outer wall of the reinforcement. Second pattern 1 is deposited by a third data set supplied to the robot.

In advantageous manner, reinforcing fibres 5 are deposited on the top surface of a pattern 1 without reaching the side wall of pattern 1 to prevent the end of reinforcing fibres 5 from overrunning onto the outer wall of the dental part compromising its ability to be sufficiently polished.

As an alternative, reinforcing fibres 5 extend up to the side walls of pattern 1 and the next pattern 1 comes and covers fibres 5 and forms the outer wall of the dental part.

In one embodiment, print head 3 forming the patterns is located on the same end of the robot as installation device 6 of reinforcing fibres 5. In this way, the same robot can fabricate the whole of the dental part. It is also advantageous to provide for the end of the robot to comprise a polymerization device to polymerize the resin forming a pattern and possibly the resin covering the reinforcing fibre. The robot thus forms a pattern and can polymerize the resin simultaneously on output from the print head progressively as the pattern is formed. Print head 3 and installation device 6 are advantageously arranged rotating on swivel joint 8 so as to switch quickly from print head 3 to installation device 6. It is particularly advantageous to use one and the same robot to form the patterns and deposit the reinforcing fibres as the divergences of the robot are applied in identical manner to the patterns and fibres thereby facilitating adjustment and correct positioning of the fibres with respect to the patterns.

Polymerization is advantageously partial in order to ensure a good strength of pattern 1 and to subsequently facilitate mechanical connection of fibres 5 when a new polymerization is performed.

In another embodiment, the robot comprises several print heads 3. Each print head 3 is associated with a different material. For example, a first head is associated with an epoxy resin, a second head is associated with a polyester resin and a third head is associated with a resin made from acrylate material. A single robot is able to deposit patterns 1 made from different resins.

It is particularly advantageous to use photopolymerizable resins with a polymerization device installed on the robot and delivering a light beam polymerizing the resins. The polymerization device can be compact which limits the dimensions of the end of the robot comprising the print head and the installation device of the reinforcing fibres.

Reinforcing fibres 5 of the tank of fibres can be unidirectional fibres or rovings or even woven strands. In advantageous manner, a roving is formed from a series of strands assembled in parallel manner stretched with a predefined stress and then wound to form the roving.

Computing circuit 4 forms a single-piece dental part comprising a resin matrix reinforced by a plurality of reinforcing fibres 5. The different reinforcing fibres 5 are arranged in the matrix with a predefined three-dimensional layout enabling the dental part to withstand a predefined set of mechanical stresses.

The dental part was formed from a data set itself originating from an imprint made on the user and a mechanical study taking account of the type of dental part to be formed, the position of the dental part, the user's age and sex, and other data.

The data set is therefore representative of a dental part tailor-made to match the user's requirements. The dental part matches the user's requirements as far as its dimensions are concerned so as to be well accepted and especially to be mechanically suitable so as not to weaken the environment around the dental part.

In advantageous manner, the dental part is covered by a finishing layer formed by a polymerizable resin. The finishing layer is polymerized and forms the outer wall of the dental part. Preferentially, the finishing layer forms the top wall and a part of the side walls of the dental part. The finishing layer can form the last pattern 1 of the dental part or on the contrary the finishing layer is formed on the last pattern of the dental part. In advantageous manner, the material forming the last pattern 1 is a material having a higher wear resistance than that forming the other patterns. Preferentially, the material forming the last pattern 1 can be tinted.

Once the different patterns 1 have been formed, the whole assembly can be subjected to a polymerization step enabling the strength of the dental part to be enhanced.

FIGS. 1 to 6 schematically illustrate a particular embodiment of a dental part that is advantageously a reinforcement. As illustrated in FIG. 1, a first pattern 1 is formed on a support by 3D printing from the data set in particular using the 3D print head.

As illustrated in FIG. 2, a set of fibres 5 is deposited on the top surface of first pattern 1 by means of a 3D installation head enabling multiple fibres 5 to be deposited with the orientation defined by the data set. Fibres 5 of the first set of fibres do not extend up to the side walls of first pattern 1.

As illustrated in FIG. 3, a second pattern 1 is deposited on first pattern 1 to cover the first set of fibres 5. The first set of fibres 5 is completely encapsulated between the two patterns 1. Second pattern 1 is deposited by 3D printing.

As illustrated in FIG. 4, a second set of fibres 5 is deposited on second pattern 1 with at least one fibre 5 fitted salient by means of three-dimensional installation head 6. Salient fibre 5 is impregnated with a resin that is polymerized so as to preserve the three-dimensional shape defined by installation head 6.

Figure 5:
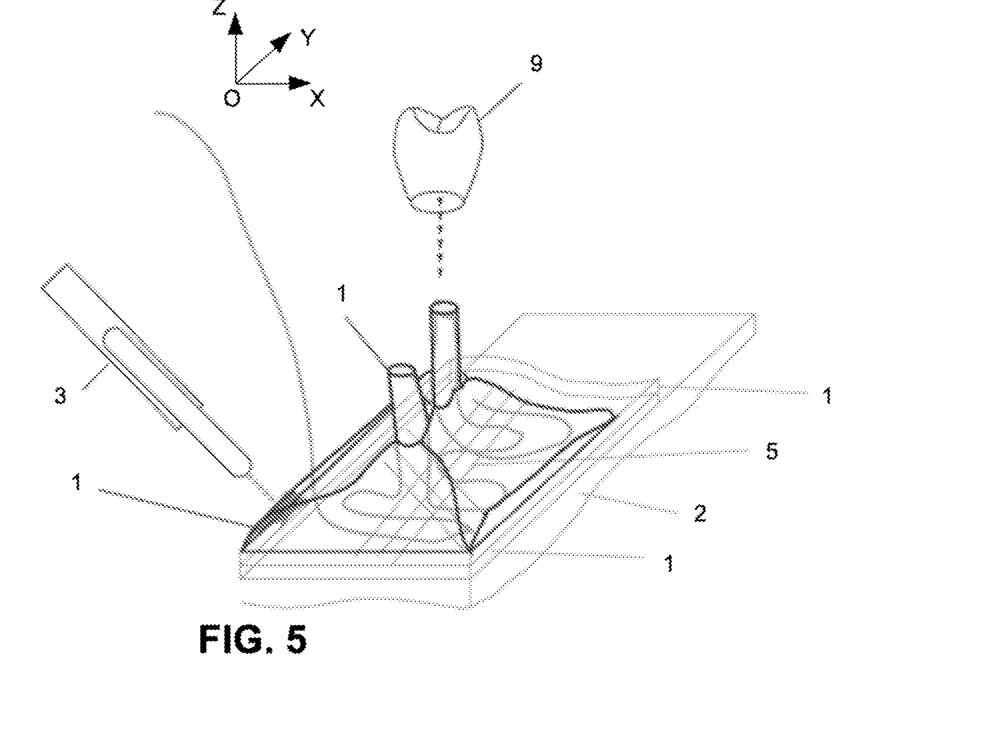
FIG. 5 schematically illustrates deposition of a third pattern by means of a three-dimensional print head on the second set of reinforcing fibres and the second pattern for a dental part according to the invention.

As illustrated in FIG. 5, a new pattern 1 is formed and covers the second set of fibres 5 so as to define the dental part. In the illustrated example, salient fibre 5 is covered to form a tenon for fitting of a prosthetic tooth 9.

Figure 6:
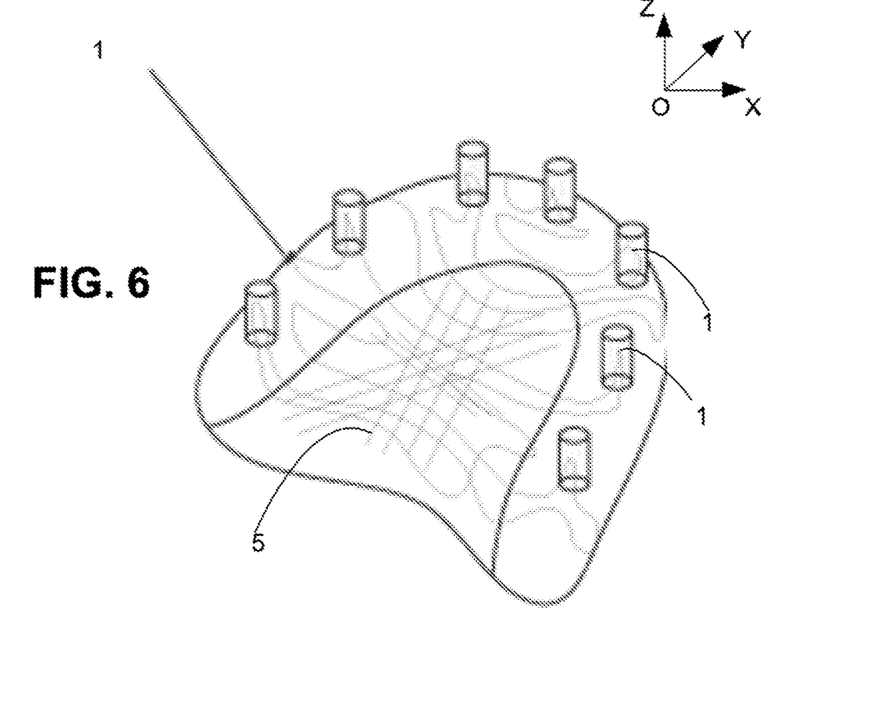
FIG. 6 schematically illustrates a reinforcement formed according to the steps illustrated in FIGS. 1 to 5.

Once the last pattern 1 has been formed, it is advantageous to perform a polymerization step that will make the different patterns 1 react with one another and with fibres 5 to enhance the strength of the dental part. As illustrated in FIG. 6, it can be observed that the different patterns 1 can have different shapes and that certain fibres 5 are specific to one pattern whereas other fibres can be shared between several patterns 1.

FIG. 6 illustrates production of a palate defining several tenons for fitting prosthetic teeth.

In the illustrated example, the dental part is formed by three patterns and two sets of fibres. It is possible to form a dental part with more patterns 1 and more sets of fibres 5 by depositing patterns 1 and sets of fibres 5 underneath the first pattern 1. Patterns 1 are successively formed and two consecutive patterns 1 are separated by a set of fibres 5. The different patterns 1 can be achieved in the same way as first pattern 1. The different sets of fibres 5 can be formed in the same way as the first set of fibres 5 or as the second set of fibres 5.

The method and the dental part are advantageously intended for a laboratory model.

The invention claimed is:

1. Method for fabricating a dental part comprising the following successive steps:

providing a data set representative of the dental part to be fabricated, the data set defining dimensional and mechanical characteristics of the dental part, forming a first pattern made from a first resin by 3D printing by means of the data set, depositing a first set of fibres on a top surface of the first pattern, the first set of fibres comprising a plurality of first fibres oriented in a first set of directions, the first set of directions being defined by the data set, the first set of fibres defining a first set of through holes, forming a second pattern made from a second resin by 3D printing by means of the data set, the second pattern filling at least a part of the first set of through holes to come into contact with the top surface of the first pattern, the second pattern at least partially covering the first set of fibres, depositing a second set of fibres on a top surface of the second pattern, the second set of fibres comprising a plurality of second fibres oriented in a second set of directions different from the first set of directions, the second set of directions being defined by means of the data set, the second set of fibres defining a second set of through holes, forming a third pattern made from a third resin by 3D printing by means of the data set, the third pattern filling at least a part of the second set of through holes to come into contact with the top surface of the second pattern, the third pattern completely covering the second set of fibres, polymerizing the first pattern, second pattern, third pattern and first and second sets of fibres to form the dental part.

2. Method according to claim 1, wherein the first set of fibres and/or second set of fibres comprise at least one fibre pre-impregnated by a resin and wherein a polymerization step is performed to make the resin react and fix the pre-impregnated resin respectively with the top wall of the first pattern and/or of the second pattern.

3. Method according to claim 1, wherein the first set of fibres and/or the second set of fibres comprise at least one fibre pre-impregnated by a resin and wherein a polymerization step is performed to define a three-dimensional shape of the at least one pre-impregnated fibre salient from the top surface of the first pattern and/or of the second pattern by a larger distance than the diameter or the thickness of the at least one pre-impregnated fibre.

4. Method according to claim 3, wherein the polymerization step is point-by-point polymerization to fix the three-dimensional shape of the at least one pre-impregnated fibre progressively as the at least one pre-impregnated fibre leaves a three-dimensional installation device of fibre.

5. Method according to claim 1, wherein the first and second sets of fibres do not overrun onto the outer wall of the dental part.

6. Method according to claim 1 comprising taking an intraoral imprint to obtain a digital file at least partially defining the dimensional characteristics of the dental part and to model a progression path of the fibres of the first set of fibres to at least partially define the mechanical characteristics of the dental part.

7. Robot for fabrication of a dental part comprising a computing circuit connected to a three-dimensional print head and to a three-dimensional installation device of at least one fibre, robot wherein the computing circuit is connected to a memory area comprising a data set representative of the dental part to be fabricated, the data set defining dimensional and mechanical characteristics of the dental part and wherein the computing circuit is configured to break the dental part down into a plurality of patterns successively formed by the three-dimensional print head, the three-dimensional installation device depositing a set of fibres with an arrangement defined by the data set between two consecutive patterns.

* * * * *